3,711,492
THIADIAZOLIDINEDIONES
Wolfgang Rohr, Mannheim, Adolf Fischer, Mutterstadt, and Albrecht Zschocke, Bad Duerkheim, Germany, assignors to Badische Anilin- & Soda-Fabrik Aktiengesellschaft, Ludwigshafen (Rhine), Germany
No Drawing. Filed Dec. 8, 1970, Ser. No. 96,273
Int. Cl. C07d 91/60
U.S. Cl. 260—302 D         5 Claims

ABSTRACT OF THE DISCLOSURE

New and valuable thiadiazolidinediones having a good herbicidal action and a process for controlling the growth of unwanted plants with these compounds.

---

The present invention relates to new and valuable substituted thiadiazolidines and herbicides containing these active ingredients.

It is known to use substituted oxadiazolidines as herbicidal agents (U.S. Pat. No. 3,437,664, Belgian Pat. No. 714,355); however, their action is unsatisfactory.

We have now found that thiadiazolidinediones of the formula

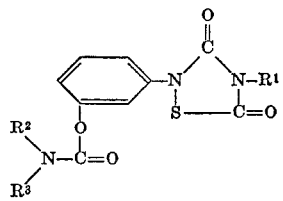

where $R^1$, $R^2$ and $R^3$ each denote hydrogen or alkyl having up to 6 carbon atoms (methyl, ethyl, propyl, isopropyl, n-butyl, sec-butyl, isobutyl, tert-butyl, dimethylbutyl, pentyl, hexyl) which may be substituted by halogen (chlorine, bromine), have a good herbicidal action on unwanted plants combined with good compatibility with crop plants such as cereals, Indian corn and cotton.

The new thiadiazolidinediones may be obtained by reaction of ureas with chlorocarbonylsulfenyl chloride:

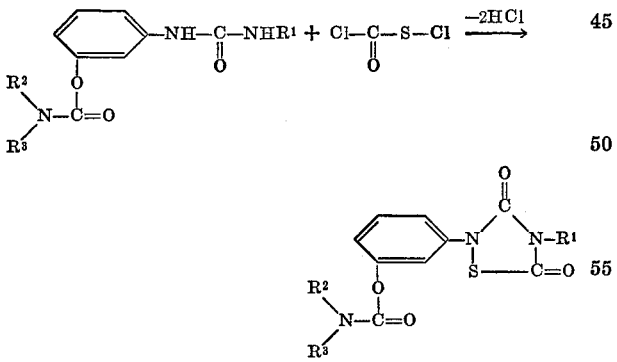

The preparation of the ureas is described in Dutch application No. 6503645.

The preparation of the compounds is illustrated below with reference to 2-(3′-n-butylcarbamoyloxyphenyl)-4-methyl-1,2,4-thiadiazolidine-3,5-dione:

17.5 parts (by weight) of N-methyl-N′-3-n-butylcarbamoyloxyphenylurea and 9.2 parts of chlorocarbonylsulfenyl chloride are heated in 150 parts of toluene at 70° to 80° C. until hydrogen chloride evolution ceases. After separation of insoluble smeary components the toluene solution is concentrated in vacuo. The residue is recrystallized from a benzene/cyclohexane mixture and ethanol: M.P. 100°–102° C.

The following active ingredients may be prepared analogously: 2 - (3′-ethylcarbamoyloxyphenyl)-4-methyl-1,2,4 - thiadiazolidine - 3,5-dione, M.P. 104°–106° C.; 2 - (3′ - tert-butylcarbamoyloxyphenyl) - 4 - methyl-1,2,4 - thiadiazolidine - 3,5 - dione, M.P. 178°–180° C.; 2 - (3′ - isopropylcarbamoyloxyphenyl)-4-methyl-1,2,4-thiadiazolidine - 3,5 - dione; 2-(3′-ethylcarbamoyloxyphenyl) - 4 - ethyl - 1,2,4-thiadiazolidine-3,5-dione.

The thiadiazolidinediones according to the invention may also be obtained by allowing alkyl isothiocyanates to react with chlorine in the presence of 3-carbamoyloxyphenyl isocyanates and by subsequently hydrolyzing the reaction products.

The reaction may be illustrated by the following equations:

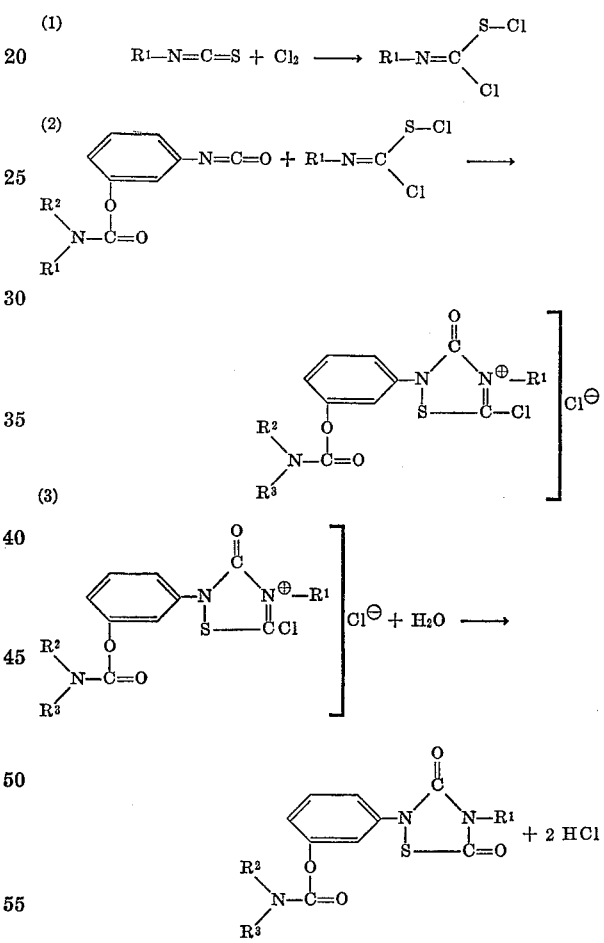

The preparation of the compounds by this method is described below with reference to 2-(3′-methylcarbamoyloxyphenyl)-4-methyl-1,2,4-thiadiazolidine-3,5-dione:

While stirring and at −5° to 0° C., 64 parts by weight of chlorine is passed into a suspension of 171 parts by weight of 3-methylcarbamoyloxyphenyl isocyanate and 66 parts by weight of methyl isothiocyanate in 2,800 parts by weight of carbon tetrachloride. To complete the reaction the whole is stirred for 3½ hours at room temperature. After adding 360 parts by weight of diethyl ether the reaction product is suction filtered and introduced into 3,000 parts by weight of water at a temperature of 15° to 20° C. for hydrolysis. After suction filtration and drying, the crude product having a melting point of 148° to 150° C. is obtained; after recrystallization from ethyl acetate, the substance melts at 150.5° to 152.5° C.

The 3-methylcarbamoyloxyphenyl isocyanate used as reaction component is obtained in the following manner:

While stirring vigorously and at −5° C., a mixture of 150 parts by weight of 3-aminophenyl-N-methylcarbamate, 207 parts by weight of triethylamine and 1,700 parts by weight of tetrahydrofuran is added to a solution of 162 parts by weight of phosgene in 1,000 parts by weight of tetrahydrofuran. After all has been added, the reaction mixture is stirred for a few minutes and then quickly filtered. The filter cake is washed with a little tetrahydrofuran and discarded.

The filtrate and the washing liquid are combined and evaporated at subatmospheric pressure. Crude 3-methylcarbamoyloxyphenyl isocyanate having a melting point of 77° to 81° C. is obtained. The product may be further purified by recrystallization from cyclohexane; melting point: 85° to 86.5° C.

The following may be prepared analogously: 2-(3'-n-propylcarbamoyloxyphenyl) - 4 - methyl - 1,2,4-thiadiazolidine-3,5-dione; 2 - (3' - isopropylcarbamoyloxyphenyl) - 4 - methyl - 1,2,4 - thiadiazolidine - 3,5-dione, M.P. 148° to 150° C.

The agents according to the invention may be used as solutions, emulsions, suspensions or dusts. The form of application depends entirely on the purpose for which the agents are being used; in any case it should ensure a fine distribution of the active ingredient.

Hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

The following examples demonstrate the use of the new active ingredients.

EXAMPLE 1

Loamy sandy soil is filled into pots and sown with Zea mays, Gossypium herbaceum, Poa annua, Alopecurus myosuroides, Echinochloa crus-galli, Sinapis arvensis and Stellaria media. The soil prepared in this manner is then treated with 2 kg. per hectare of 2-(3'-n-butyl-carbamoyloxyphenyl)-4-methyl - 1,2,4 - thiadiazolidine - 3,5 - dione (I) and, for comparison, with 2 kg. per hectare of 2-(3'-dimethylcarbamoyloxyphenyl) - 4 - methyl - 1,2,4 - oxadiazolidine-3,5-dione (II), these amounts of the active ingredients each being dispersed in 500 liters of water per hectare.

After 4 to 5 weeks, it is ascertained that active ingredient I has a stronger herbicidal action on the unwanted plants combined with the same good crop plant compatibility.

The results of the experiment are given in the following table:

|  | Active ingredient | |
|---|---|---|
|  | I | II |
| Zea mays | 5 | 5 |
| Gossypium herbaceum | 0 | 0 |
| Poa annua | 100 | 80 |
| Alopecurus myosuroides | 100 | 80 |
| Echinochloa crus-galli | 100 | 80 |
| Sinapis arvensis | 100 | 90 |
| Stellaria media | 100 | 90 |

NOTE.—0=No damage; 100=Complete destruction.

EXAMPLE 2

The plants Zea mays, Triticum vulgare, Poa annua, Alopecurus myosuroides, Echinochloa crus-galli, Sinapis arvensis and Stellaria media are treated at a growth height of 3 to 16 cm. with 1 kg. per hectare of 2-(3'-n-butylcarbamoyloxyphenyl)-4-methyl - 1,2,4 - thiadiazolidine-3,5-dione (I) and, for comparison, with 1 kg. per hectare of 2-(3'-dimethylcarbamoyloxyphenyl)-4-methyl-1,2,4-oxadiazolidine-3,5-dione (II), these amounts of the active ingredients each being dispersed in 500 liters of water per hectare.

After 3 to 4 weeks it is ascertained that active ingredient I has a stronger herbicidal action on the broad-leaved and grassy weeds combined with the same good crop plant compatibility.

The results of the experiment are given in the following table:

|  | Active ingredient | |
|---|---|---|
|  | I | II |
| Zea mays | 5 | 5 |
| Triticum vulgare | 5 | 5 |
| Poa annua | 100 | 70 |
| Alopecurus myosuroides | 95 | 70 |
| Echinochloa crus-galli | 95 | 60 |
| Sinapis arvensis | 100 | 80 |
| Stellaria media | 100 | 80 |

NOTE.—0=No damage; 100=Complete destruction.

The action of 2 - (3' - methylcarbamoyloxyphenyl)-4-methyl-1,2,4-thiadiazolidine-3,5-dione corresponds to that of I in Examples 1 and 2.

EXAMPLE 3

80 parts by weight of compound I from Example 1 is mixed with 20 parts by weight of N-methyl-α-pyrrolidone. A mixture is obtained which is suitable for application in the form of very fine drops.

EXAMPLE 4

20 parts by weight of compound 3 from Example 1 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water, and uniformly distributing it therein, an aqueous dispersion is obtained containing 0.2% by weight of the active ingredient.

EXAMPLE 5

20 parts by weight of 2-(3'-tert-butylcarbamoyloxyphenyl)-4-methyl - 1,2,4 - thiadiazolidine - 3,5 - dione is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of 2-(3'-isopropylcarbamoyloxyphenyl)-4-methyl - 1,2,4 - thiadiazolidine - 3,5 - dione is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of 2-(3'-ethylcarbamoyloxyphenyl)-4-methyl - 1,2,4 - thiadiazolidine-3,5-dione is well mixed with 3 parts by weight of the sodium salt of diisobutyl-naphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 8

3 parts by weight of compound I from Example 1 is intimately mixed with 97 parts by weight of particulate kaolin. A dust is obtained containing 3% by weight of the active ingredient.

EXAMPLE 9

30 parts by weight of compound I from Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:
1. A thiadiazolidinedione of the formula

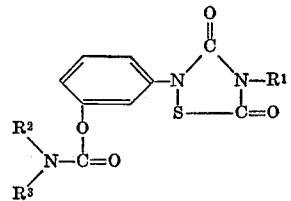

wherein $R^1$, $R^2$ and $R^3$ each denotes hydrogen, alkyl of 1 to 6 carbon atoms or said alkyl substituted by chlorine or bromine.

2. 2-(3'-n-butylcarbamoyloxyphenyl)-4-methyl - 1,2,4-thiadiazolidine-3,5-dione.
3. 2-(3'-tert-butylcarbamoyloxyphenyl)-4-methyl-1,2,4-thiadiazolidine-3,5-dione.
4. 2-(3'-isopropylcarbamoyloxyphenyl)-4-methyl-1,2,4-thiadiazolidine-3,5-dione.
5. 2-(3'-ethylcarbamoyloxyphenyl)-4-methyl-1,2,4-thiadiazolidine-3,5-dione.

References Cited
UNITED STATES PATENTS 3,534,057  10/1970  Krenzer _____ 260—307 B NICHOLAS S. RIZZO, Primary Examiner R. J. GALLAGHER, Assistant Examiner U.S. Cl. X.R.

71—90; 260—479 C, 566 D